United States Patent [19]
Kamil et al.

[11] 3,781,498
[45] Dec. 25, 1973

[54] LIQUID LEVEL DETECTOR

[75] Inventors: Zvi Kamil, Tel Aviv; Yoel Amir, Omer; Omri Talmon, Beer-Sheva, all of Israel

[73] Assignee: Beta Engineering & Development Ltd., Beer-Sheva, Israel

[22] Filed: June 26, 1972

[21] Appl. No.: 266,447

[52] U.S. Cl. .............................. 200/84 C, 335/207
[51] Int. Cl. ............................................. H01h 35/18
[58] Field of Search................ 200/84 C; 73/313; 335/207; 340/244 A

[56] References Cited
UNITED STATES PATENTS

| | | | |
|---|---|---|---|
| 1,404,328 | 1/1922 | Stearns | 200/153 W |
| 2,391,068 | 12/1945 | Nye | 200/153 W |
| 3,412,391 | 11/1968 | Ward | 335/207 |
| 3,200,645 | 8/1965 | Levins | 73/313 |
| 3,437,771 | 4/1969 | Nusbaum | 200/84 C |

*Primary Examiner*—David Smith, Jr.
*Attorney*—Benjamin J. Barish

[57] ABSTRACT

A liquid-level detector comprises a sensing device including a magnetically-actuated switch and a fixed magnet whose magnetic field causes the switch to normally assume one operating condition. The sensing device further includes a movable magnet movable from a first position where it exerts no significant influence on the magnetic field of the fixed magnet to a second position wherein it influences the magnetic field of the fixed magnet to cause the switch to assume its other operating condition. The detector further includes a float carrying a float magnet adapted to move the movable magnet to actuate the switch.

7 Claims, 3 Drawing Figures

LIQUID LEVEL DETECTOR

BACKGROUND OF THE INVENTION

The present invention relates to liquid-level detectors, such as are used for detecting the level of a liquid (e.g., water, oil) in a container to provide an electrical signal when the level goes above or below a predetermined point. The electrical signal may be used for controlling the flow of the liquid into the container or out of the container, to sound an alarm, etc.

A large number of liquid-level detectors are known. In one type, the liquid level is detected by a photocell, but in this case the walls of the column in which the liquid level is detected must be transparent and must be kept clean. In another type, the liquid level is detected by a capacitance probe, but this type requires complicated circuitry for detecting the level by the change in capacitance of the probe.

SUMMARY OF THE INVENTION

The present invention provides a new type of liquid-level detector which includes magnets to control a magnetically-actuated switch to detect the liquid level.

According to the present invention, there is provided a liquid-level detector, comprising, a float adapted to be placed in the liquid so as to rise and lower with the change in level thereof, and a sensing device adapted to be fixed in position at the level to be detected for sensing the movement of the float with respect thereto. The sensing device comprises a non-magnetic housing, a magnetically-actuated switch disposed within the housing and having two operating conditions, and a fixed magnet disposed within the housing and located with respect to the switch such that its magnetic field causes the switch to normally assume one operating condition. A movable magnetic member is disposed within the housing and is movable therein from a first position wherein it exerts no significant influence on the magnetic field of the fixed magnet with respect to the switch, to a second position wherein it so influences the magnetic field to cause the switch to assume its other operating condition. A float magnet is carried by the float and moves the movable magnetic member with it from the first to the second position or, vice-versa, as the float rises and falls with the change in level of the liquid. The movable magnet is retained in its moved position until returned by the float magnet.

According to further preferred features which are included in the emdodiment of the invention described below, the movable and fixed magnets are both straight permanent magnets. They are disposed with their axes parallel to the direction of movement of the float, are of the same length, and have opposite polarities at their respective ends.

According to a further important feature of the present invention, the movable magnet is movable in a passageway within the housing, the passageway being at least twice the length of the movable magnet with the top of the passageway being substantially coextensive with the top of the fixed magnet. The first position of the movable magnet is completely below the fixed magnet and the second position of the movable magnet is substantially coextensive with the fixed magnet. The opposite polarization of the ends of the fixed and movable magnets cause the movable magnet to move with a snap-action from one to the other position.

In the preferred embodiment of the invention described below, the magnetically-actuated switch is a reed relay and is disposed with its axis parallel to the direction of movement of the float.

Further features and advantages of the invention will be apparent from the description below.

BRIEF DESCRIPTION OF THE DRAWINGS

The invention is herein described, by way of example only, with reference to accompanying drawings, wherein.

DESCRIPTION OF THE PREFERRED EMBODIMENT

Figure 2:
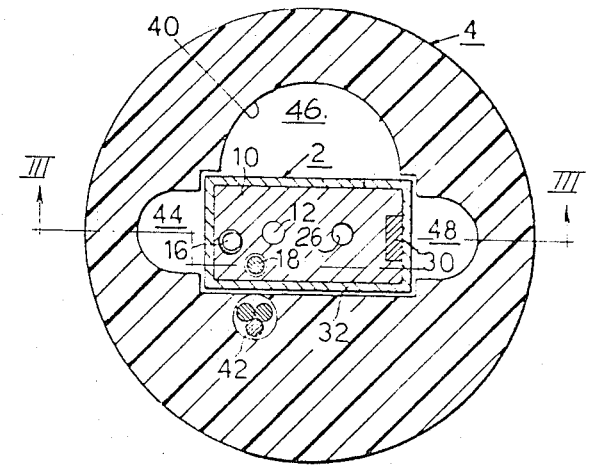
FIG. 2 is a sectional view along lines II—II of FIG. 3.

The liquid-level detector illustrated in the drawings comprises an elongated unit, generally designated 2, adapted to be fixed in a predetermined position so as to be immersed in the liquid, and a float 4 enclosing unit 2 and adapted to float in the liquid so as to rise and lower with the change in level thereof. Fixed unit 2 includes 3 liquid-level detectors, namely maximum level detector D1, minimum level detector D2, and alarm level detector D3. All three detectors are of the same construction, and therefore a description of one (D1, best illustrated in FIGS. 2 and 3) will suffice for the others.

Detector D1 includes a housing 10 having an axial opening 12 therethrough for receiving a magnetically-actuated switch in the form of a reed relay 14. Reed relays, as well known, include contacts formed of magnetic reeds sealed within a small glass tube which contacts are actuated in response to the presence or absence of a magnetic field.

A straight permanent magnet 16 is fixed within housing 10 parallel to the axis of reed relay 14. Magnet 16 is polarized so that its upper end is, e.g., North and its lower end is, e.g. South, and is located with respect to reed relay 14 so that its magnetic field causes the contacts of the relay normally to be closed.

Housing 10 includes a second magnet 18 movable in a passageway 20 formed in the vicinity of both fixed magnet 16 and reed relay 14. Movable magnet 18 is also a straight permanent magnet and is of the same length and diameter as fixed magnet 16, except that its ends are oppositely polarized with respect to the fixed magnet. Passageway 20 is at least twice the length of the movable and fixed magnets 18, 16, with the top of the passageway substantially coextensive with the top of fixed magnet 16. Movable magnet 18 may therefore assume two positions in passageway 20, namely one position (illustrated in FIG. 3) completely below magnet 16, and a second position substantially coextensive with the fixed magnet. In the first position (the lower one), movable magnet 18 exerts no significant influence on the magnet field of fixed magnet 16 with respect to reed relay 14, but in the second position (the higher one), it influences the magnet field of the fixed magnet so as to cause the contacts of reed relay 14 to open.

Passageway 20 is formed by an axial bore made in housing 10 terminating short of the top of the housing, and closed at the bottom by a plug 22 having a conical upper end 24 for engagement with the bottom of the movable magnet 18 when the latter is in its lower position.

Housing 10 is further formed with another axial bore 26 for the electrical conductors leading from reed relay 14 to a terminal box 28 at the top of unit 2.

The housings 14 for the detectors D1, D2, D3 are fixed at spaced intervals along a bar 30 (FIG. 2); and all the housings, together with the supporting bar 30, are enclosed within an outer jacket 32. The housings 10, supporting bar 30, and outer jacket 32 are all made of non-magnetic material, for example aluminum or brass.

Figure 3:
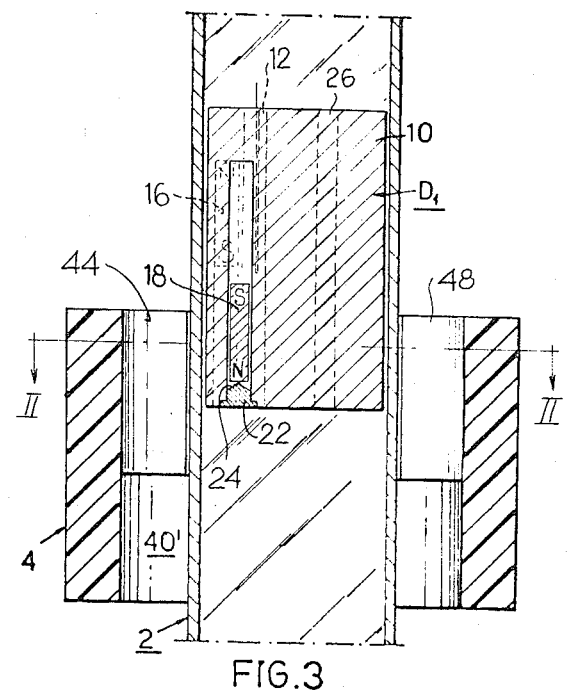
FIG. 3 is a sectional view along lines III—III of FIG. 2. De

Float unit 4 is made of rigid, light, plastic material, such as polyurethane. It is annular in shape, being formed with a central opening 40 to enclose the fixed unit 2. A plurality of permanent magnets 42 are embedded in the float unit 4 adjacent to one side of opening 40 in alignment with passageway 20 and movable magnet 18 of the fixed unit. The other three sides of opening 40 are preferably formed with enlarged, semicircular cut-outs 44, 46, 48 to reduce the weight of the float unit and the frictional contact between it and the fixed unit 2. For the same reasons the bottom half of opening 40 in the float unit is preferably enlarged, as shown at 40' (FIG. 3).

The magnets 42 embedded in the float unit 4 are also straight permanent magnets. Preferably, they are about the same length and diameter as magnets 16 and 18, but three (or two) are provided so as to produce a substantially greater magnetic field than magnets 16 and 18.

Magnets 42 are polarized in the opposite direction than movable magnet 18.

The liquid-level detector illustrated operates in the following manner.

Figure 1:
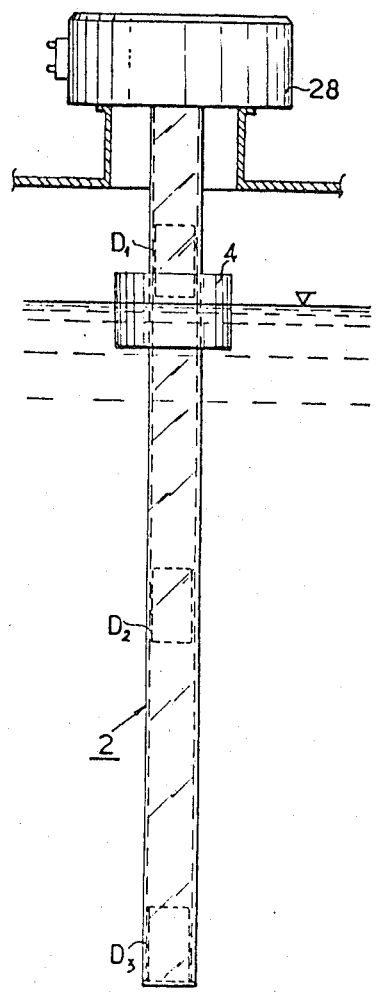
FIG. 1 is a side elevational view of a liquid-level detector constructed in accordance with the invention.

Considering first the operation of the maximum-level detector D1, it will be seen that the position of float 4 in FIG. 1 and 3 is below that of the detector. Accordingly, as shown in FIG. 3, movable magnet 18 will be in its lower position in passageway 20, and therefore only the magnetic field of fixed magnet 16 will be effective to influence reed relay 14. In this case, the contacts of the reed relay will be closed.

Now, as the level of the liquid rises, float 4 will also rise, and its magnets 42 will drag along with them the movable magnet 18, the latter moving in passageway 20. As movable magnet 18 reaches its upper position within passageway 20, it influences the magnet field of fixed magnet 16 with respect to reed relay 14 so as to diminish or cancel the magnet field acting on the contacts of the reed relay. The contacts open and thus provide an electrical signal that the level of the liquid has reached its maximum level.

When the level of the liquid drops, float 4 will lower, whereby its magnets 42 drag along with the movable magnet 18, until the latter reaches its lower position within passageway 20, whereby it ceases to influence the magnetic field of fixed magnet 16 with respect to reed relay 14. The contacts of the reed relay then reclose.

This arrangement also produces a "snap-action effect" as the movable magnet 18 moves from its lower to its higher position, and back again to its lower position. This is because of the opposite polarization of the ends of the movable magnet with respect to those of the fixed magnet. Consider, for example, that the upper end of fixed magnet 16 is polarized North and its lower end South, whereas the upper end of movable magnet 18 is polarized South, and its lower end North. It will be seen that in the lower position of movable magnet 18, its South pole faces the South pole of fixed magnet 16, and therefore the repelling magnetic force between the two like poles urges movable magnet 18 to its lower position. As the movable magnet rises under the action of the float magnets 42, this repelling force between the two South poles is overcome (float magnets 42 being more powerful than either of magnets 16 or 18), until the South pole of movable magnet 18 passes the centerline of fixed magnet 16. At this point the South pole of movable magnet 18 is attracted by the North pole of fixed magnet 16, thereby "snapping" the movable magnet upwardly within the passageway 20. The effect is like the "snap-action" effect produced by an over-center spring, which produces fast and sharp-acting switching. The same thing occurs as magnet 18 moves from its upper position to its lower position, since its South pole, as it passes the South pole of fixed magnet 16, will begin to be repelled by the latter.

The minimum-level detector D2 and the alarm-level detector D3 operate in the same manner as the float 4 passes these respective levels.

Many variations may be made. For example, while it is preferable to have movable magnet 18 in the form of a permanent magnet, to provide the above "snap-action" effect, this is not absolutely essential, since its main function is, when in one position, not to influence the magnet field of fixed magnet 16 with respect to reed relay 14, and when in its second position, to influence the magnet field so as to cause the reed relay to open. Also, while it is preferable to use a reed relay for the magnetically-actuated switch, this too is not essential. Further, while reed relay has been described as being closed when movable magnet 18 is in its lower position and opened when the magnet is in its upper position, these operating conditions of the relay could of course be reversed. Also, each detector would preferably be adjustably mounted on bar 30.

Many other variations, modifications and applications of the illustrated embodiment will be apparent.

We claim:

1. A liquid-level detector, comprising, a float adapted to be placed in the liquid so as to rise and lower with the change in level thereof, and a sensing device adapted to be fixed in position at the level to be detected for sensing the movement of the float with respect thereto, said sensing device comprising a nonmagnetic housing, a magnetically-actuated switch disposed within the housing and having two operating conditions, a fixed permanent magnet disposed within the housing and located with respect to said switch such that its magnetic field causes the switch to normally assume one operating condition, a passageway formed in said housing, a movable permanent magnet disposed within the housing passageway and movable therein from a first position wherein it exerts no significant influence on the magnetic field of said fixed magnet with respect to the switch, to a second position wherein it influences the magnetic field of said fixed magnet with respect to the switch to cause the switch to assume its other operating condition, and a float magnet carried by said float and moving said movable magnet with it from said first to said second position or from said second to said first position, as the float rises and lowers with the change in level of the liquid, said movable magnet being retained in its moved position until returned by said float magnet, said passageway being at least twice the length of said movable magnet with the top of the passageway being substantially coextensive with the top of said fixed magnet, said first position of the movable magnet being completely below the fixed magnet and said second position of the movable magnet being sustantially coextensive with the fixed magnet, the ends of the fixed and movable magnets being oppositely polarized causing the movable magnet to move with a snap-action from said first to said second position, and from said second to said first position.

2. A detector according to claim 1 wherein said movable and fixed magnets are both straight permanent magnets, are disposed with their axes parallel to the direction of movement of said float, are of the same length.

3. A detector according to claim 1, wherein said passageway is in the form of a bore closed at the bottom by a plug having a conical upper end for engagement with the bottom of the movable magnet when the latter is in its first position.

4. A detector according to claim 1, wherein said switch is a reed relay and is disposed with its axis parallel to the direction of movement of said float.

5. A detector according to claim 1, wherein said sensing device is carried on a bar immersible in the liquid.

6. A detector according to claim 5, wherein said bar carries a plurality of said sensing devices each to detect the movement of the float past a predetermined level, said float enclosing said bar and plurality of sensing devices and being movable with respect thereto.

7. A detector according to claim 6, wherein said bar and plurality of sensing devices carried thereby are enclosed within a non-magnetic jacket.

* * * * *